United States Patent
van der Wagt (10) Patent No.: US 10,276,229 B2
(45) Date of Patent: Apr. 30, 2019

(54) ADJUSTING SIGNAL TIMING

(71) Applicant: Teradyne, Inc., North Reading, MA (US)

(72) Inventor: Jan Paul Antonie van der Wagt, Carlsbad, CA (US)

(73) Assignee: Teradyne, Inc., North Reading, MA (US)

( * ) Notice: Subject to any disclaimer, the term of this patent is extended or adjusted under 35 U.S.C. 154(b) by 0 days.

(21) Appl. No.: 15/683,906

(22) Filed: Aug. 23, 2017

(65) Prior Publication Data

US 2019/0066757 A1     Feb. 28, 2019

(51) Int. Cl.
| | |
|---|---|
| *G11C 7/10* | (2006.01) |
| *G11C 7/00* | (2006.01) |
| *G11C 11/4076* | (2006.01) |
| *G11C 8/18* | (2006.01) |
| *H04L 7/033* | (2006.01) |
| *H05K 1/02* | (2006.01) |
| *G06F 17/50* | (2006.01) |

(52) U.S. Cl.
CPC ...... *G11C 11/4076* (2013.01); *G06F 17/5031* (2013.01); *G11C 7/1072* (2013.01); *G11C 8/18* (2013.01); *H04L 7/0337* (2013.01); *H05K 1/0248* (2013.01); *H05K 1/0298* (2013.01)

(58) Field of Classification Search
CPC ..... G11C 11/4076; G11C 8/18; G11C 7/1072; H04L 7/0337; H05K 1/0248; H05K 1/0298; G06F 17/5031
USPC ................................... 365/189.05, 193, 194
See application file for complete search history.

(56) References Cited

U.S. PATENT DOCUMENTS

| | | | |
|---|---|---|---|
| 4,463,273 | A | 7/1984 | Dingwall |
| 5,298,799 | A | 3/1994 | Cochran et al. |
| 5,646,884 | A | 7/1997 | van der Wagt |
| 5,699,003 | A | 12/1997 | Saeki |

(Continued)

FOREIGN PATENT DOCUMENTS

| | | |
|---|---|---|
| JP | 2001-084287 A | 3/2001 |
| KR | 10-1502759 B1 | 3/2015 |

(Continued)

OTHER PUBLICATIONS

File History for U.S. Appl. No. 15/683,901, 46 pages (Retrieved Aug. 23, 2017).

(Continued)

*Primary Examiner* — Viet Q Nguyen
(74) *Attorney, Agent, or Firm* — Choate, Hall & Stewart LLP (57) ABSTRACT

Example circuitry to adjust a rise-fall skew in a signal includes: a latch including a first latch input, a second latch input, and a latch output, each of the first latch input and the second latch input being responsive to a rising edge of a version of a signal to provide a predefined logic level at the latch output; a first delay circuit that is controllable to configure a first delay, the first delay circuit being electrically connected to the first latch input and being for adjusting a rise portion of a skew in a first version of the signal; and a second delay circuit that is controllable to configure a second delay, the second delay circuit being electrically connected to the second latch input and being for adjusting a fall portion of the skew in a second version the signal.

14 Claims, 4 Drawing Sheets

(56) References Cited

U.S. PATENT DOCUMENTS

| | | | |
|---|---|---|---|
| 5,883,829 A | 3/1999 | van der Wagt | |
| 5,953,249 A | 9/1999 | van der Wagt | |
| 6,075,395 A | 6/2000 | Saeki | |
| 6,114,890 A * | 9/2000 | Okajima | H03L 7/0805 327/170 |
| 6,150,242 A | 11/2000 | Van der Wagt et al. | |
| 6,218,874 B1 | 4/2001 | Lerner et al. | |
| 6,252,430 B1 | 6/2001 | van der Wagt et al. | |
| 6,252,441 B1 | 6/2001 | Lee et al. | |
| 6,291,981 B1 | 9/2001 | Sartschev | |
| 6,380,779 B1 | 4/2002 | Lachman et al. | |
| 6,456,214 B1 | 9/2002 | van der Wagt | |
| 6,490,193 B1 | 12/2002 | van der Wagt et al. | |
| 6,509,859 B1 | 1/2003 | van der Wagt | |
| 6,667,490 B2 | 12/2003 | Van der Wagt et al. | |
| 6,687,868 B1 | 2/2004 | Furukawa et al. | |
| 6,703,907 B1 | 3/2004 | van der Wagt | |
| 6,771,061 B2 | 8/2004 | Sartschev et al. | |
| 6,859,075 B1 | 2/2005 | Van der Wagt | |
| 6,874,097 B1 * | 3/2005 | Aliahmad | G06F 1/10 375/355 |
| 7,187,742 B1 | 3/2007 | Logue et al. | |
| 7,287,143 B2 * | 10/2007 | Lee | G11C 7/1066 711/167 |
| 7,557,643 B2 | 7/2009 | Jin et al. | |
| 7,593,497 B2 * | 9/2009 | Conner | H04L 7/033 375/362 |
| 7,728,650 B2 | 6/2010 | van der Wagt | |
| 7,868,681 B2 | 1/2011 | van der Wagt | |
| 8,094,766 B2 * | 1/2012 | Conner | G01R 31/31726 327/156 |
| 8,410,824 B2 | 4/2013 | Mehdizad Taleie et al. | |
| 8,516,425 B2 | 8/2013 | Nikitin et al. | |
| 8,565,034 B1 * | 10/2013 | Lu | G06F 13/1689 365/189.05 |
| 8,692,538 B2 | 4/2014 | Phillips | |
| 8,705,592 B2 | 4/2014 | Oh et al. | |
| 9,147,620 B2 * | 9/2015 | van der Wagt | G01R 31/3191 |
| 9,279,857 B2 * | 3/2016 | Lin | G01R 31/31922 |
| 9,397,670 B2 | 7/2016 | van der Wagt et al. | |
| 9,425,747 B2 | 8/2016 | Bazarjani et al. | |
| 9,503,065 B1 * | 11/2016 | van der Wagt | H03K 5/14 |
| 2001/0014131 A1 | 8/2001 | Mashimo et al. | |
| 2002/0101945 A1 | 8/2002 | Audy et al. | |
| 2003/0088836 A1 | 5/2003 | Kanazawa et al. | |
| 2003/0140318 A1 | 7/2003 | Kitahara et al. | |
| 2003/0234670 A1 | 12/2003 | Curran | |
| 2004/0068682 A1 * | 4/2004 | Takei | G11B 20/14 714/700 |
| 2004/0223566 A1 * | 11/2004 | Yamashita | H04L 7/00 375/354 |
| 2005/0024120 A1 | 2/2005 | Chang et al. | |
| 2005/0104618 A1 | 5/2005 | Han | |
| 2005/0193356 A1 | 9/2005 | Kuekes et al. | |
| 2006/0111861 A1 * | 5/2006 | Horne | G01R 31/31905 702/89 |
| 2006/0250169 A1 | 11/2006 | Sareen et al. | |
| 2006/0256880 A1 * | 11/2006 | Frisch | G01R 31/31706 375/257 |
| 2006/0256908 A1 | 11/2006 | Ludwig | |
| 2007/0126410 A1 | 6/2007 | Figoli | |
| 2007/0205818 A1 * | 9/2007 | Fiedler | H03K 3/356139 327/217 |
| 2008/0018371 A1 * | 1/2008 | Suda | G01R 31/31922 327/172 |
| 2008/0048905 A1 | 2/2008 | McEwan | |
| 2008/0056029 A1 | 3/2008 | Cheng | |
| 2008/0234961 A1 * | 9/2008 | Tanaka | G01R 31/3191 702/82 |
| 2008/0307277 A1 | 12/2008 | Tschanz et al. | |
| 2008/0309400 A1 | 12/2008 | van der Wagt | |
| 2009/0220110 A1 | 9/2009 | Bazarjani et al. | |
| 2009/0249141 A1 | 10/2009 | Yasuda | |
| 2010/0295581 A1 | 11/2010 | Mehdizad Taleie et al. | |
| 2010/0299644 A1 | 11/2010 | Kawai | |
| 2011/0309865 A1 | 12/2011 | Cordos | |
| 2012/0313618 A1 | 12/2012 | Phillips | |
| 2012/0326738 A1 | 12/2012 | Kim et al. | |
| 2012/0326760 A1 | 12/2012 | Kesselring et al. | |
| 2013/0009686 A1 | 1/2013 | Bucher et al. | |
| 2013/0027102 A1 | 1/2013 | Chen et al. | |
| 2013/0117598 A1 * | 5/2013 | Lee | H03K 5/131 713/503 |
| 2013/0260485 A1 | 10/2013 | van der Wagt et al. | |
| 2015/0137838 A1 * | 5/2015 | Lin | G01R 31/31922 324/750.01 |
| 2015/0324514 A1 | 11/2015 | Teig et al. | |
| 2016/0006441 A1 | 1/2016 | van der Wagt et al. | |
| 2016/0065183 A1 * | 3/2016 | Antonie van der Wagt | H03K 5/04 324/537 |
| 2016/0112223 A1 * | 4/2016 | Kitsukawa | H04L 25/4904 375/346 |
| 2016/0164509 A1 * | 6/2016 | Ma | H03K 5/12 327/170 |
| 2016/0173090 A1 * | 6/2016 | Meinerzhagen | H03K 19/00323 327/145 |
| 2017/0278289 A1 * | 9/2017 | Marino | G06T 7/44 |

FOREIGN PATENT DOCUMENTS

| | | |
|---|---|---|
| WO | WO-01/33240 A2 | 5/2001 |
| WO | WO-2008/118841 A1 | 10/2008 |
| WO | WO-2017/039852 A1 | 3/2017 |

OTHER PUBLICATIONS

International Preliminary Report on Patentability for PCT/US2015/046082, 7 pages (dated Feb. 28, 2017).

International Search Report for PCT/US2015/046082, 3 pages (dated Nov. 27, 2015).

Written Opinion for PCT/US2015/046082, 6 pages (dated Nov. 27, 2015).

File History for U.S. Appl. No. 15/683,901, 136 pages (Retrieved Oct. 23, 2018).

File History for U.S. Appl. No. 14/840,498, 187 pages (Retrieved Jan. 18, 2019).

File History for U.S. Appl. No. 15/683,901, 151 pages (Retrieved Jan. 18, 2019).

International Preliminary Report on Patentability for PCT/US2016/042742, 9 pages (dated Mar. 6, 2018).

International Search Report for PCT/US2013/029121, 3 pages (dated Jun. 3, 2013).

International Search Report for PCT/US2016/042742, 3 pages (dated Oct. 12, 2016).

International Search Report for PCT/US2018/046647, 4 pages (dated Nov. 19, 2018).

Written Opinion for PCT/US2013/029121, 8 pages (dated Jun. 3, 2013).

Written Opinion for PCT/US2016/042742, 8 pages (dated Oct. 12, 2016).

Written Opinion for PCT/US2018/046647, 9 pages (dated Nov. 19, 2018).

International Search Report for PCT/US2018/046711, 3 pages (dated Dec. 4, 2018).

Written Opinion for PCT/US2018/046711, 8 pages (dated Dec. 4, 2018).

* cited by examiner

ADJUSTING SIGNAL TIMING

TECHNICAL FIELD

This specification relates generally to circuitry that is usable to adjust signal timing, e.g., to reduce skew in the signal.

BACKGROUND

In some contexts, skew refers to the difference between an expected timing of a signal and an actual timing of the signal. Rising edge skew is the distortion of a signal pulse resulting from a delay in the rising edge of the signal; falling edge skew is the distortion of a signal pulse resulting from delay in the falling edge of the signal; and rise/fall skew (RFS) is the distortion of a signal pulse resulting from delays in both the rising edge of the signal and the falling edge of the signal.

SUMMARY

Example circuitry to adjust a rise-fall skew in a signal comprises: a latch comprising a first latch input, a second latch input, and a latch output, with each of the first latch input and the second latch input being responsive to a rising edge of a version of a signal to provide a predefined logic level at the latch output; a first delay circuit that is controllable to configure a first delay, with the first delay circuit being electrically connected to the first latch input and being for adjusting a rise portion of a skew in a first version of the signal; and a second delay circuit that is controllable to configure a second delay, with the second delay circuit being electrically connected to the second latch input and being for adjusting a fall portion of the skew in a second version the signal. The example circuitry may comprise one or more of the following, either alone or in combination.

The latch may comprise a set-reset (SR) latch. The latch may comprise an SR latch in which an output of the latch follows a last asserted input to the latch. The first latch input may be a set input, and the second latch input is a reset input. An output of the latch may follow a last asserted input to the latch in an event of overlap of the set input and the reset input. The first delay and the second delay may be configurable independently. The first version of the signal may be an a non-inverted version of the signal, and the second version of the signal may be an inverted version of the signal.

The example circuitry may comprise: a first circuit path comprising the first delay circuit; and a second circuit path comprising the second delay circuit, with the first circuit path and the second circuit path being connected to a common node, and with the common node being configured to receive the signal. The first delay circuit may comprise a first circuit input and the second delay circuit may comprise a second circuit input, with the second circuit path comprising an inverter circuit electrically connected between the common node and the second circuit input. The first version of the signal may be a non-inverted version of the signal and a second version of signal may be an inverted version of input signal, with the inverted version of the signal being produced by passage of the signal through the inverter circuit. The first delay circuit may comprise a first circuit input and the second delay circuit may comprise a second circuit input, with the first circuit input and the second circuit input being electrically connected to the common node and being configured so that the first version of the signal comprises a non-inverted version of the signal and the second version of the signal comprises an inverted version of the signal. The first circuit input and the second circuit input may each be configured to receive a differential signal that is based on the signal.

The first delay may be different from the second delay, with the first delay being to adjust timing of a first edge of a signal pulse of the first version of the signal and the second delay being to adjust timing of a second edge of a signal pulse of the second version of the signal. Adjusting the timing of the first edge may comprise adding the first delay to the first edge, and adjusting the timing of the second edge may comprise adding the second delay to the second edge. The latch may be configured so that the predefined logic level at the latch output follows a latest asserted input to the first latch input or second latch input. The latest asserted input may comprise the rising edge of the signal.

An example method to adjust a rise-fall skew in a signal comprises: controlling a first delay of a first version of a signal based on a first skew to produce a first delayed signal; controlling a second delay of a second version of the signal based on a second skew to produce a second delayed signal; and using the first delayed signal and the second delayed signal to produce an output signal having one or more features that are adjusted in time. The example method may comprise one or more of the following, either alone or in combination.

The one or more features may comprise a rising edge of a pulse in the signal and a falling edge of the pulse. In the output signal, the rising edge may be moved forward by the first delay and the falling edge may be moved forward by the second delay. The first skew may be associated with a rising edge of the signal and the second skew may be associated with a falling edge of the signal, with the first skew and the second skew affecting a pulse-width of the signal relative to a pulse-width of an original signal upon which the signal is based. The one or more features of the output signal may be adjusted in time so that a rising edge of the output signal and a falling edge of the output signal produces a pulse-width that corresponds to the pulse-width of the original signal. The rising edge of the output signal and the falling edge of the output signal may produce a pulse-width that equals the pulse-width of the original signal. The rising edge of the output signal and the falling edge of the output signal may produce a pulse-width that deviates by less than a predetermined amount from the pulse-width of the original signal.

The example method may be performed using circuitry on a path of the signal, with the circuitry being configured to adjust the rise-fall skew. The first skew may take into account rising edge skew that occurs on the signal path between two reference points that are located before and after the circuitry, and the second skew may take into account falling edge skew that occurs on the signal path between the two reference points that are located before and after the circuitry. The one or more features of the output signal may be adjusted in time so that a rising edge of the output signal and a falling edge of the output signal produces a pulse-width that is adjusted to correct for the rising edge skew and the falling edge skew.

The example method may be performed using circuitry on a path of the signal, with the circuitry being configured to adjust the rise-fall skew. The first skew may take into account rising edge skew that occurs on the signal path between two reference points that are located before and after the circuitry, and the second skew may take into account falling edge skew that occurs on the signal path between the two reference points that are located before and after the circuitry. The one or more features of the output signal may be adjusted in time so that a rising edge of the output signal and a falling edge of the output signal produces a pulse-width having a predefined amount of skew based on adjustment to the rising edge skew and the falling edge skew.

The first version of the signal may be an non-inverted version of the signal and the second version of the signal may be an inverted version of the signal.

Controlling the first delay may comprise configuring a first delay circuit through which the first version of the signal passes. Controlling the second delay may comprise configuring a second delay circuit through which the second version of the signal passes. Using the first delayed signal and the second delayed signal to produce the output signal may comprise applying the first delayed signal to a first latch input of a latch, and applying the second delayed signal to a second latch input of the latch, with each of the first latch input and the second latch input being responsive to a rising edge of a signal to provide a predefined logic level at a latch output of the latch.

The latch may be configured so that the predefined logic level at the latch output follows a latest asserted input to the first latch input or second latch input. The first delay may be different from the second delay because the first skew is different from the second skew. The one or more features that are adjusted in time may be signal edges. The signal edges may be adjusted at a precision level measured in picoseconds.

Any two or more of the features described in this specification, including in this summary section, can be combined to form implementations not specifically described herein.

The systems and techniques described herein, or portions thereof, can be implemented as/controlled by a computer program product that includes instructions that are stored on one or more non-transitory machine-readable storage media, and that are executable on one or more processing devices to control (e.g., coordinate) the operations described herein. The systems and techniques described herein, or portions thereof, can be implemented as an apparatus, method, or electronic system that can include one or more processing devices and memory to store executable instructions to implement various operations.

The details of one or more implementations are set forth in the accompanying drawings and the description below. Other features, objects, and advantages will be apparent from the description and drawings, and from the claims.

DESCRIPTION OF THE DRAWINGS

Like reference numerals in different figures indicate like elements.

DETAILED DESCRIPTION

Described herein are examples of circuitry to adjust timing of a signal. For example the circuitry may be able to correct for a rise-fall skew (RFS) in a signal. Although the examples presented discuss correcting for RFS, the example circuitry may also be used to adjust signal timing to correct for rising edge skew only or falling edge skew only, or to correct for other appropriate type(s) of timing errors. As noted, RFS is the distortion of a signal pulse resulting from delays in both the rising edge of the signal and the falling edge of the signal. An example of the circuitry includes a latch, such as the set-reset (SR) latch 5 described with respect to FIG. 1. This example latch includes a first latch input, a second latch input, and a latch output, The first latch input and the second latch input are each responsive to a rising edge of a signal to provide a predefined logic level, such as a logic high (or "one") or a logic low (or "zero"), at the latch output. In this example, latch 5 is not responsive to other features of the signal, such as a falling edge of the signal; however, in some implementations, different types of latches that are responsive to different signal features may be used.

Figure 1:
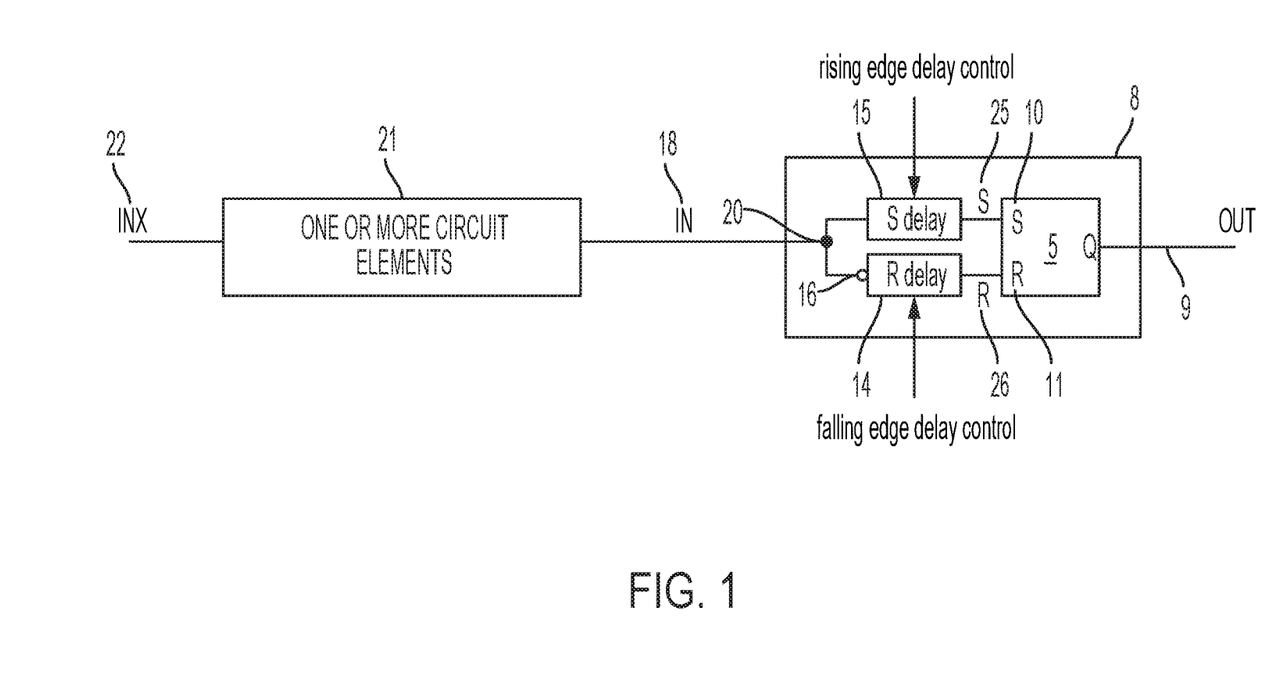
FIG. 1 is a block diagram of parts of example circuitry that is configurable to adjust timing of a signal, e.g., to reduce skew.

The example circuitry also includes controllable delay circuits—one delay circuit connected to each latch input in some implementations—for providing signals to the latch inputs. For example, as described below, the delay circuits may be electrically connected to a common input node, and connected, at their outputs, to their respective latch inputs. In some implementations, the delay circuits include a first delay circuit that is controllable to configure a first delay, and a second delay circuit that is controllable to configure a second delay. The second delay may be independent of the first delay and may be different than the first delay. The second delay may be independent of the first delay and may be the same as the first delay in some implementations (e.g., where there is no skew to be corrected). In this example, the first delay circuit is electrically connected to the first latch input and is for adjusting the delay in a first version of a signal (e.g., a non-inverted version of the signal) to produce a first delayed signal input to the latch. In this example, the second delay circuit is electrically connected to the second latch input and is for adjusting the delay in a second version of the signal (e.g., an inverted version of the signal) to produce a second delayed signal input to the latch.

RFS may be reduced, in some implementations, by controlling the magnitude of the first delay and/or by controlling the magnitude of the second delay. The resulting delayed signals control the latch to produce an output signal having one or more features (e.g., edges) that are adjusted in time. For example, in some implementations, a signal—also referred to as the input signal—may have been subjected to RFS by passage through one or more circuit elements, including, e.g., on- or off-chip buffers. As a result, the pulse-width of the input signal may be different than an intended pulse-width. Using the circuitry described herein, one or both of the first delay or the second delay may be controlled, e.g., programmed, to cure this skew, at least partially. For example, the first delay may be controlled to change a rising edge signal timing and the second delay may be controlled to change a falling signal edge timing. By changing one or both timings, the pulse-width of the input signal may be changed, e.g., corrected, to produce an intended pulse-width. This correction of the pulse-width is a type of RFS deskewing.

FIG. 1 shows an example implementation of RFS deskew circuitry 8. Circuitry 8 includes a set-reset (SR) latch 5 in this example. In some implementations, other types of latch or delay-controlling circuitry may be used. Latch 5 responds to S(et) and R(eset) input pulses to provide a signal at an output Q 9. For example, the rising edge of a logic high signal on the S input 10 causes a transition to a logic high signal at output Q 9. Likewise, the rising edge of a logic high signal at the R input 11 causes a transition to a logic low signal at output Q 9. Accordingly, in this example, latch 5 includes SRM-type latch functionality, where "M" refers to memory. In an SRM latch, the state at output Q is determined by a last incoming rising edge on either the S input or the R input. The actual S and R pulses can have any appropriate widths, and they can even overlap, at least partially, without adversely affecting the operation of the SRM latch. So, in an example, an incoming rising edge on the S input produces a logic high at output Q, and an incoming rising edge input on the R input produces a logic low at output Q. In some implementations, changes to states of signals at the S and R inputs that do not include a rising edge do not affect the value at output Q 9.

For a non-SRM latch, S and R values that overlap—e.g., that are simultaneously high—may produce an indeterminate output result. That is not the case with an SRM latch, since an SRM latch changes the output signal state in response to rising edges, not input logic states per se. Thus, the SRM latch allows set and reset to be simultaneously high, e.g., S and R pulses may overlap. Rather than the output being indeterminate or assuming a default state, the output follows the last asserted input: if S comes after R, the latch sets; if R comes after S, the latch resets.

Circuitry 8 also includes controllable delay circuits 14 (R delay) and 15 (S delay). These controllable delay circuits may include any appropriate programmable circuitry including, but not limited to, buffers and/or logic circuits. In some implementations each of delay circuits 14 and 15 may be implemented using the same types of circuits. In some implementations, each of delay circuits 14 and 15 may be implemented using different types of circuits. In FIG. 1, delay circuit 14 has an inverter 16 at its input. Any appropriate circuitry may be used to implement the inverter. In operation, inverter 16 produces an inverse of an input signal ("IN") 18, and provides that inverted version of the input signal to delay circuit 14, causing delay circuit 14 to delay the inverted version of the input signal IN and not the original (non-inverted) version of the input signal IN.

In the example of FIG. 1, the inputs of controllable delay circuits 14 and 15 are electrically connected to a common circuit point or node 20. In the example of FIG. 1, in the case of controllable delay circuit 14, inverter 16 is between the input of controllable delay circuit 14 and the common node 20. Common node 20 receives input signal IN 18, which thereafter proceeds towards each of controllable delay circuits 14 and 15. Controllable delay circuit 15 thus receives a non-inverted version of that input signal, delays the non-inverted version of that input signal, and outputs a delayed signal to the S input 10 of latch 5. Controllable delay circuit 14 receives an inverted version of that input signal (since the input signal passes first through inverter 16), delays the inverted version of that input signal, and outputs a delayed signal to the R input 11 of latch 5.

In this example, the input signal IN received at common node 20 has been subjected to skew—in this example RFS (although the skew may be rising or falling edge skew only)—by passage through one or more example circuit elements 21, such as, on- and off-chip distribution/buffering circuitry. That is, the RFS occurs between two reference points—one before circuit elements 21 and one after circuit elements 21. Any circuit elements, delay lines, combination of circuit elements and delay lines, or the like may produce the RFS. The input signal IN is thus a distorted version of its original signal ("INX") 22, which passed through one or more circuit elements 21 and suffered from the RFS, resulting in the input signal IN. For example, the pulse-width of IN may be different than the pulse-width of INX (the pulse-width of INX is used herein as an example intended pulse-width). Circuitry 8 may be used to adjust the pulse-width of IN, e.g., to deskew IN, so that the signal at output 9 resembles INX. For example, circuitry 8 may be used to correct the pulse-width of IN so that the signal at output 9 has the same shape, including pulse-width, as INX. In some implementations, circuitry 8 may program or change the skew of IN to any appropriate or desired skew, and the signal at output 9 may, or may not, have the same shape as INX. In some implementations, circuitry 8 may program or change the skew of IN so that the signal at output 9 has less than a predetermined amount of skew relative to INX. In the example that follows, the signal at output 9 ("OUT") is produced to have the same pulse-width as INX, or the same pulse-width as INX within an acceptable predefined tolerance. In some implementations, that tolerance may be on the order of single picoseconds (ps). In some implementations, that tolerance may exceed single picoseconds.

Figure 2:
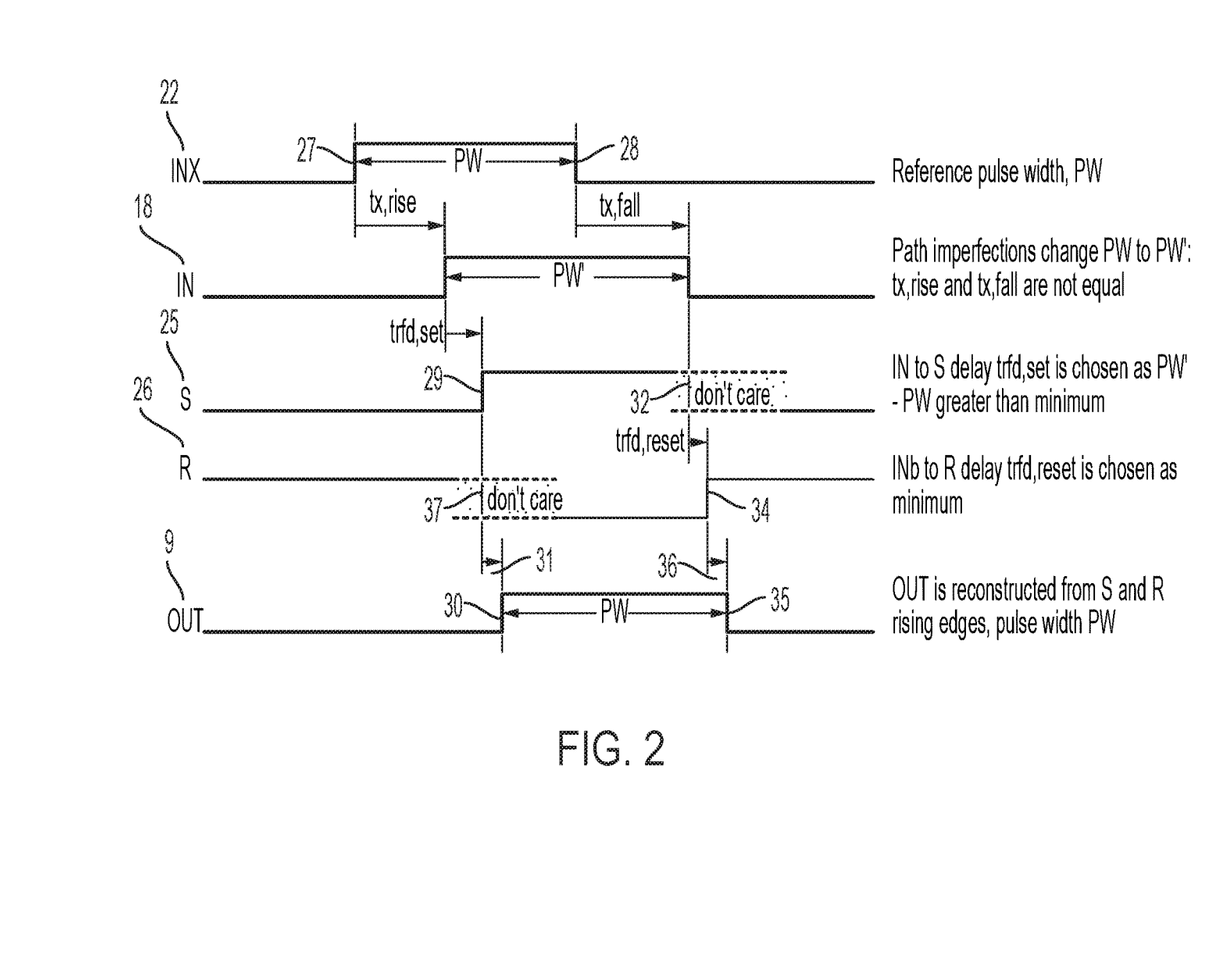
FIG. 2 includes timing diagrams showing example inputs to the circuitry of FIG. 1, and an example output of the circuitry of FIG. 1.

Referring also to FIG. 2, INX 22 and IN 18 are separated by one or more circuit elements 21 (which may be, e.g., signal buffers) that causes delays for both the rising and falling signal edges of INX. These two delays may not be equal. In some implementations, example delays may be on the order of several nanoseconds (ns), and the difference between the rising and falling edge delay, or RFS skew, may be around 100 picoseconds (ps). As a result, in FIG. 2, signal INX 22 has a pulse-width PW and signal IN 18 has a different pulse-width PW. The difference in pulse-widths is a result of the RFS caused by passage of INX through one or more circuit elements 21.

During operation of circuitry 8, both rising edge delay ("S delay" of controllable delay circuit 15) and falling edge delay ("R delay" of controllable delay circuit 14) are controlled (e.g., programmed) to be predefined values (e.g., to predefined minimum values) to produce, respectively signals S 24 and R 26 at their outputs. During calibration, it is determined whether the rising edge 27 or the falling edge 28 of INX 22 has been more delayed by the signal path imperfections of one or more circuit elements 21 In the example of FIG. 2 the falling edge delay tx,fall is greater than the rising edge delay tx,rise. Accordingly, in this example, in circuitry 8, the RFS falling edge delay ("R delay") trfd,reset is controlled (e.g., programmed) to remain at a predefined minimum value and the RFS rising edge delay ("S delay") trfd,set is controlled (e.g., programmed) to a value to compensate (e.g., within an appropriate step resolution) for the skew from IN to INX. For example, trfd,set is programmed to a value that produces a pulse-width at output (OUT Q) 9 of PW. The programming described herein may be performed by any appropriate computing systems such as the computer of FIG. 4, one or more processing devices, control circuitry, or the like, e.g., in response to measured skew or user input.

The operation of SRM latch enables the foregoing operation, in this example. For example, a rising edge 29 of S 25 triggers a rising edge 30 at output Q 9, and includes a set delay 31 for passage through latch 5. A falling edge 37 at the R input does not affect operation of latch 5, and therefore, does not affect the signal at output Q 9. This edge is therefore labeled "don't care" Likewise, a falling edge 32 at of S 25 does not does not affect operation of latch 5, and therefore, does not affect output Q 9. Accordingly, falling edge 32 is labeled "don't care". A rising edge 34 of R 26 triggers a falling edge 35 at output Q 9. and includes a set delay 36 for passage through latch 5. The values for trfd,set and trfd,reset may be controlled, as described above, to produce a pulse-width PW of the signal at output 9 (OUT) that is the same as, or within a range of, the pulse-width of INX 22. As noted above, the values for trfd,set and trfd,reset may be controlled to produce any appropriate pulse-width at output Q 9, and are not limited to replicating the pulse-width of INX. Furthermore, the values for trfd,set and trfd,reset may be controlled to correct for RFS, rising edge skew only, or falling edge skew only. In some implementations, one of trfd,set or trfd,reset will not need to be adjusted. For example, one value may stay at the predefined minimum value, while the other value is adjusted. In some implementations, both trfd,set and trfd,reset may be adjusted.

Figure 3:
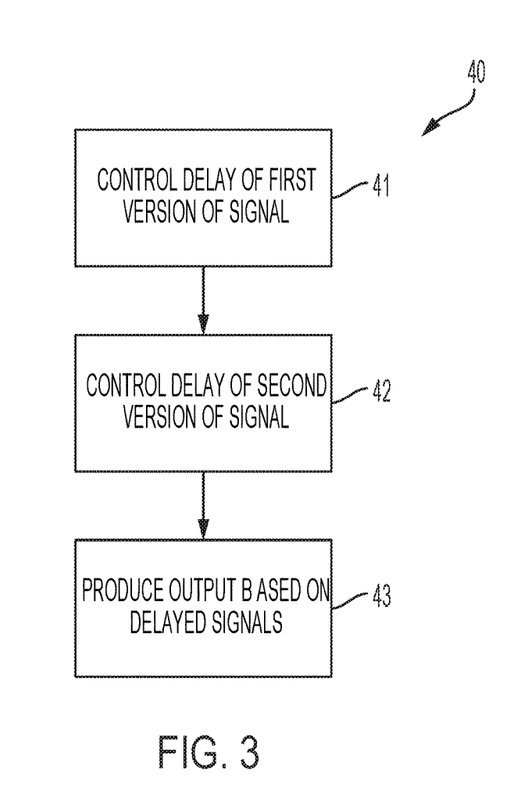
FIG. 3 is a flowchart of an example process that may be implemented by the circuitry of FIG. 1 to adjust signal timing.

FIG. 3 shows an example of a process 40 that may be implemented using circuitry 8 of FIG. 1. According to process 40, a first delay of a first version of a signal is controlled (41) based on a first skew to produce a first delayed signal. For example, the first version of the signal may be a non-inverted version of IN 18. The S delay may be controlled to be at a minimum value or other value to produce a delayed input signal to the S input of latch 5 that is based on the non-inverted version of IN 18. A second delay of a second version of the signal is controlled (42) based on a second skew to produce a second delayed signal. For example, the second version of the signal may be the inverted version of IN 18 produced by inverter 16. The R delay may be controlled to be at a minimum value or other value to produce a delayed input signal to the R input of latch 5 that is based on the inverted version of IN 18. The first delayed signal and the second delayed signal control latch 5 to produce (43) an output signal at output Q 9 having one or more features that are adjusted in time. For example, as shown with respect to FIG. 2, the rising edges of the S and R inputs to latch 5 may control latch 5 to produce an output having a desired pulse-width or other appropriate feature. For example, the pulse-width at output Q 9 may be the same as the pulse-width of the INX signal 22, which has not been subjected to RFS. In some implementations, the pulse-width at output Q 9 may deviate by less than a predetermined amount from the pulse-width of INX signal 22. This is a recognition that, in some implementations, it may not be possible to eliminate all skew entirely, but rather skew may be reduced to below some predefined acceptable level.

In some implementations, a strobe delay to a measurement device at output 9 can be adjusted to compensate for an overall delay. In some implementations, this delay may be adjusted to be correct for the falling edge with trfd,reset at minimum. After this, trfd,set may be increased until the rising edge is also calibrated.

In circuit paths that employ differential circuits, inverter 16 need not be employed. In implementations of this type, the inversion can be implemented simply by flipping the role of positive and negative polarity wires in a circuit path. Accordingly, in some implementations, inverting the signals in the circuit path (e.g., as an input to delay element 14) is performed by switching wire paths of differential signals used in the circuit path. Note that in the differential case, signal lines in FIG. 1, for example, represent two actual wires, one for the positive voltage and one for the negative voltage of the signal (the signal is then, by definition, the difference of these two voltages).

In some implementations, the techniques and processes described herein may be used in the context of timing generator analog circuitry that includes delay lines (e.g., circuit paths). Modern CMOS (complementary metal-oxide-semiconductor) fabrication processes may lead to device-mismatch-induced unintended pulse-width variation that may be corrected using the techniques and processes described herein. In an example, the techniques and processes described herein may be used with a timing generator to perform RFS deskewing on long source synchronous signal paths related delay lines for both data (DQ) and strobe (DQS) signals.

In some implementations, the techniques and processes described herein may provide relatively fine skew reduction, e.g., to reduce RFS to, e.g., 1 ps or 2 ps in some implementations. However, the techniques and processes described herein may be used to provide appropriate RFS reduction at values other than 1 ps or 2 ps. In this regard, coarse skew reduction techniques may be implemented in combination with the relatively finer skew reduction techniques and processes described herein.

Figure 4:
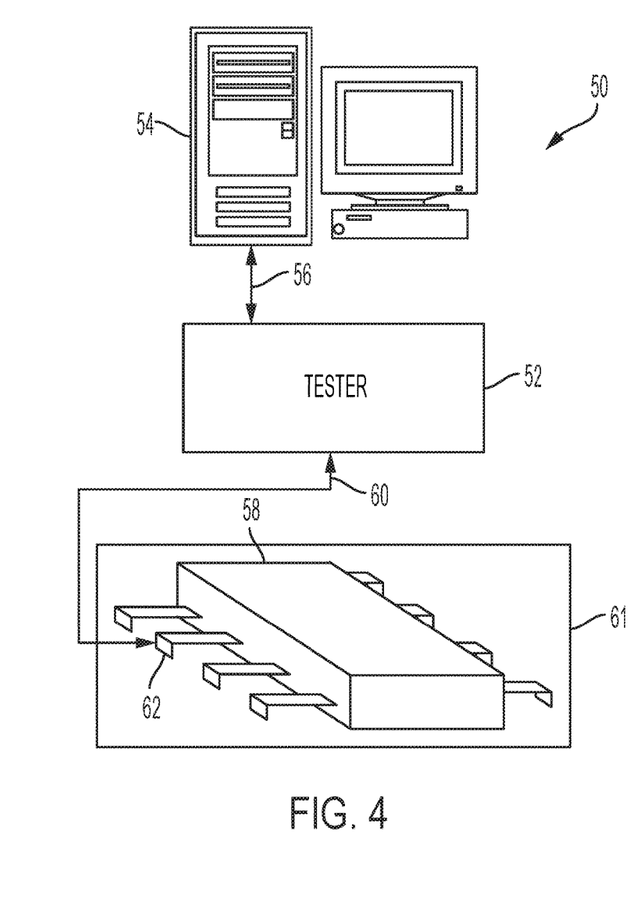
FIG. 4 is a block diagram of parts of example automatic test equipment (ATE) that may include circuit paths that are controllable to reduce skew.

FIG. 4 shows a general ATE configuration in which techniques and processes described herein may be implemented. It is, however, emphasized that the techniques and processes described herein are not limited to any particular ATE configuration, including that of FIG. 4, and that the techniques and processes may be used in any appropriate context, including outside of the testing content.

Referring to FIG. 4, an example ATE system 50 for testing a DUT 58, such as those described herein, includes a tester (or "test instrument") 52. DUT 58 may be interfaced to a DIB 61. Tester 52 may include a number of channels, each of which may be a circuit path having an RFS that is controllable using the techniques and processes described herein. To control tester 52, system 50 includes a computer system 54 that interfaces with tester 52 over a hardwire connection 56. In some implementations, the computer system may control the polarity switches described herein to implement RFS reduction on one or more of the channels, as appropriate.

In an example operation, computer system 54 sends commands to tester 52 to initiate execution of routines and functions for testing DUT 58. Such executing test routines may initiate the generation and transmission of test signals to the DUT 58 and collect responses from the DUT. Various types of DUTs may be tested by system 50. In some implementations, the DUT may be any appropriate semiconductor or other device, such as an integrated circuit (IC) chip (e.g., memory chip, microprocessor, analog-to-digital converter, digital-to-analog converter, etc.) or other devices.

To provide test signals and collect responses from the DUT, tester 52 is connected to an interface to the internal circuitry of DUT 58. For example, the DUT may be inserted into a socket of DIB 61, which contains interfaces to electrical connections between the DUT and the tester. A conductor 60 (e.g., one or more conductive pathways) is connected to the interface and is used to deliver test signals (e.g., switching or DC test signals, etc.) to the internal circuitry of DUT 58. Conductor 60 also senses signals in response to the test signals provided by tester 52. For example, a voltage signal or a current signal may be sensed at pin 62 in response to a test signal and sent over conductor 60 to tester 52 for analysis. Such single port tests may also be performed on other pins included in DUT 58. For example, tester 52 may provide test signals to other pins and collect associated signals reflected back over conductors (that deliver the provided signals). By collecting the reflected signals, the input impedance of the pins may be characterized along with other single port testing quantities. In other test scenarios, a digital signal may be sent over conductor 60 to pin 62 for storing a digital value on DUT 58. Once stored, DUT 58 may be accessed to retrieve and send the stored digital value over conductor 60 to tester 52. The retrieved digital value may then be identified to determine if the proper value was stored on DUT 58.

Along with performing single port measurements, a two-port or multi-port test may also be performed by tester 52. For example, a voltage signal may be injected over conductor 60 into pin 62 in a force voltage mode, and a response signal may be collected from one or more other pins of DUT 58. This response signal may be provided to tester 52 to determine quantities, such as gain response, phase response, and other throughput measurement quantities. Other tests may also be performed. Tester 52 may source current to the DUT during force voltage mode, as described herein, based on the testing required.

The techniques and processes described herein may be implemented by, and/or controlled using, hardware or a combination of hardware and software. For example, a system like the ones described herein may include various controllers and/or processing devices located at various points in the system to control operation of the automated elements. A central computer may coordinate operation among the various controllers or processing devices. The central computer, controllers, and processing devices may execute various software routines to effect control and coordination of the various automated elements.

The techniques and processes described herein can be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the testing can be performed by one or more programmable processors executing one or more computer programs to perform the functions described herein. All or part of the testing can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any "electrical connection" as used herein may imply a direct physical connection or a wired or wireless connection that includes or does not include intervening components but that nevertheless allows electrical signals to flow between connected components. Any "connection" involving electrical circuitry mentioned herein, unless stated otherwise, is an electrical connection and not necessarily a direct physical connection regardless of whether the word "electrical" is used to modify "connection".

Elements of different implementations described herein may be combined to form other implementations not specifically set forth above. Elements may be left out of the structures described herein without adversely affecting their operation. Furthermore, various separate elements may be combined into one or more individual elements to perform the functions described herein.

What is claimed is:

1. Circuitry to adjust a rise-fall skew in a signal, comprising:
   a latch comprising a first latch input, a second latch input, and a latch output, the first latch input being responsive to a rising edge of a first input signal but not to a falling edge of the first input signal, and the second latch input being responsive to a rising edge of a second input signal but not to a falling edge of the second input signal, the rising edge of the first input signal or the rising edge of the second input signal to control the latch to provide a logic level at the latch output;
   a first delay circuit that is controllable to configure a first delay, the first delay circuit being electrically connected to the first latch input and being for adjusting a rise portion of a skew in a first version of a signal to produce the first input signal; and
   a second delay circuit that is controllable to configure a second delay, the second delay circuit being electrically connected to the second latch input and being for adjusting a fall portion of the skew in a second version of the signal to produce the second input signal.

2. The circuit of claim 1, wherein the latch comprises a set-reset (SR) latch.

3. The circuit of claim 2, wherein the latch comprises an SR latch in which an output of the latch follows a last asserted input to the latch.

4. The circuit of claim 2, wherein the first latch input is a set input, the second latch input is a reset input; and
   wherein an output of the latch follows a last asserted input to the latch in an event of overlap of the set input and the reset input.

5. The circuitry of claim 1, wherein the first delay and the second delay are configurable independently.

6. The circuitry of claim 1, wherein the first version of the signal is a non-inverted version of the signal, and the second version of the signal is an inverted version of the signal.

7. The circuitry of claim 1, further comprising:
   a first circuit path comprising the first delay circuit; and
   a second circuit path comprising the second delay circuit, the first circuit path and the second circuit path being connected to a common node, the common node being configured to receive the signal.

8. The circuitry of claim 7, wherein the first delay circuit comprises a first circuit input and the second delay circuit comprises a second circuit input, the second circuit path comprising an inverter circuit electrically connected between the common node and the second circuit input; and wherein the first version of the signal is a non-inverted version of the signal and the second version of signal is an inverted version of input signal, the inverted version of the signal being produced by passage of the signal through the inverter circuit.

9. The circuitry of claim 7, wherein the first delay circuit comprises a first circuit input and the second delay circuit comprises a second circuit input, the first circuit input and the second circuit input being electrically connected to the common node and configured so that the first version of the signal comprises a non-inverted version of the signal and the second version of the signal comprises an inverted version of the signal.

10. The circuitry of claim 9, wherein the first input signal is a first differential signal and the first latch input is configured to receive two conductors carrying the first differential signal, and the second input signal is a second differential signal and the second latch input is configured to receive two conductors carrying the second differential signal.

11. The circuitry of claim 1, wherein the first delay is different from the second delay, the first delay being to adjust timing of a first edge of a signal pulse of the first version of the signal and the second delay being to adjust timing of a second edge of a signal pulse of the second version of the signal.

12. The circuitry of claim 11, wherein adjusting the timing of the first edge comprises adding the first delay to the first edge, and adjusting the timing of the second edge comprises adding the second delay to the second edge.

13. The circuitry of claim 1, wherein the latch is configured so that the logic level at the latch output follows a latest asserted first input signal or second input signal.

14. The circuitry of claim 13, wherein the latest asserted first input signal or second input signal comprises the rising edge of the first input signal or the rising edge of the second input signal.

* * * * *